(12) United States Patent
Hsieh

(10) Patent No.: US 6,915,491 B2
(45) Date of Patent: Jul. 5, 2005

(54) METHOD AND APPARATUS FOR INTUITIONALLY MOVING THE FOCUS BETWEEN A WINDOW AREA AND A TOOL BAR

(75) Inventor: Wenhao Hsieh, Taipei Hsien (TW)

(73) Assignee: Kinpo Electronics, Inc., Taipei (TW)

( * ) Notice: Subject to any disclaimer, the term of this patent is extended or adjusted under 35 U.S.C. 154(b) by 576 days.

(21) Appl. No.: 10/173,154

(22) Filed: Jun. 18, 2002

(65) Prior Publication Data

US 2003/0231217 A1 Dec. 18, 2003

(51) Int. Cl.$^7$ .............................................. G06F 15/00
(52) U.S. Cl. ...................................... 715/802; 715/788
(58) Field of Search ............................. 715/802, 788, 715/759, 810

(56) References Cited

U.S. PATENT DOCUMENTS

| | | | | |
|---|---|---|---|---|
| 5,430,839 A | * | 7/1995 | Jagannathan et al. | 715/802 |
| 6,072,485 A | * | 6/2000 | Barnes et al. | 715/802 |
| 6,842,795 B2 | * | 1/2005 | Keller | 710/15 |

\* cited by examiner

*Primary Examiner*—Cao (Kevin) Nguyen
(74) *Attorney, Agent, or Firm*—Bacon & Thomas PLLC

(57) ABSTRACT

A method and apparatus for moving the focus between the window area and the tool bar, said focus movement can be performed on an information apparatus, such as a set top box (STB). The present invention enables a user to control the focus, the window area, and the tool bar via directional buttons only. When one directional button is pressed, the focus may move within the window area, within the tool bar area, from the window area to the tool bar, or from the tool bar to the window area.

10 Claims, 4 Drawing Sheets

US 6,915,491 B2

METHOD AND APPARATUS FOR INTUITIONALLY MOVING THE FOCUS BETWEEN A WINDOW AREA AND A TOOL BAR

BACKGROUND OF THE INVENTION

1. Field of the Invention

The present invention relates to a method and apparatus for intuitionally moving the focus between a window area and a tool bar and, more particularly, to performing such movements on an information apparatus field such as a set top box (STB).

2. Description of the Related Art

The conventional STB is connected to a television. A user can surf on the Internet via a network interface provided by the STB and watch TV programs via a TV tuner. The user can choose to watch TV or to surf on the Internet. The STB provides network connectivity, enabling the user to surf on the Internet without the need of a personal computer. The STB serves as a multi-function work platform, which is a great improvement for information devices.

The traditional browser usually includes the window area and the tool bar. The window area displays the website contents which usually comprise a plurality of links. By clicking links, users can surf to other website pages of the same website or other websites. The tool bar usually comprises a plurality of function buttons that execute specific purposes, such as "review previous web page".

In traditional browsers that are mostly used in personal computers, a user usually uses a mouse to control the movement of the cursor in order to control focus movement. However, a user can also use keyboard "function keys" to move the focus without using a mouse. In traditional browsers, the "Tab" function key is used to control focus movement when the focus is in the window area. If a user wants to move the focus to the tool bar, the user has to press the "Alt" function key and then use the directional keys (e.g. the left key, the right key) to control focus movement for tool bar function button selection. Similarly, if the user wants to move the focus from the tool bar to the window area, the user has to press the "Alt" function key again. Please note that the focus is usually invisible, but the user knows focus location because the link or the function button will be "highlighted" when the focus moves there.

Because set top boxes or the apparatus having Internet connection functions usually does not have a mouse many confusions and inconveniences would occur if traditional methods (i.e. use "Alt", "Tab", direction keys) are applied.

Therefore, there is a need to develop a more convenient method to move the focus between the window area and the tool bar.

SUMMARY OF THE INVENTION

The object of the present invention is to provide an easy-to-use operating interface for a user. The user can use directional buttons intuitionally moving the focus between the window area and the tool bar when surfing on websites.

With regard to this objective, a method of using input device directional buttons (e.g. the left key, the right key) to move the focus between the window area and the tool bar is disclosed according to the one embodiment of the present invention. Wherein, the window area comprises a plurality of links and the tool bar usually comprises a plurality of function buttons. The method according to the present invention comprises the following steps:

condition 1, the current focus position is within the window area:

step A: receiving an up, down, left or right button signal pressed by the user;

step B: determining if there is a link along the directional button path pressed by the user, if yes, then move the focus to the link, if no, then proceed to step C;

step C: determining if the directional button pressed by the user is the up button, then move the focus to the tool bar;

condition 2, the current focus position is within the tool bar:

step D: receiving an up, down, left or right button signal pressed by the user; and step E: determining if there is a function button along the directional button path pressed by the user, if yes, then move the focus to the function button, if no, then proceed to step F;

step F: determining if the directional button pressed by the user is the down button, then move the focus to the window area.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
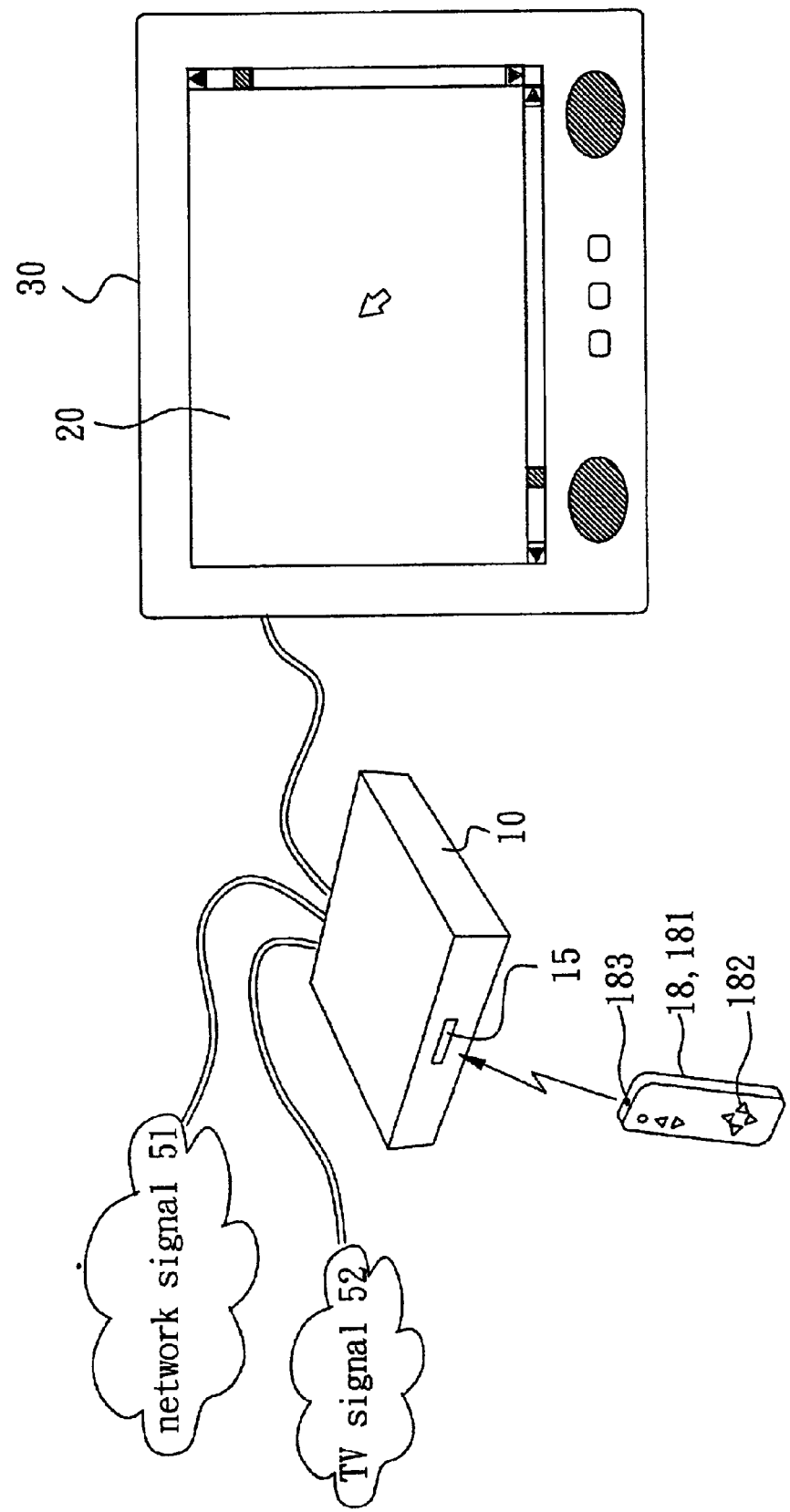
FIG. 1 is a schematic drawing of the environment according to the present invention.

Please refer to FIG. 1. FIG. 1 is a schematic drawing of the environment according to the present invention. A set top box (STB) 10 is connected to a television 30 and able to receive a network signal 51 and a television signal 52. A user can watch TV programs and surf on the Internet via the television 30. An input device 18 with an infrared transmitter 183 is used for providing control instructions to the STB 10 infrared receiver 15. Generally, the input device 18 is a remote control 181 or a keyboard. As shown in FIG. 1, the remote control 181 includes a cursor directional button 182 and the infrared transmitter 183. The STB 10 infrared receiver 15 receives the infrared light sent by the infrared transmitter 183.

Figure 2:
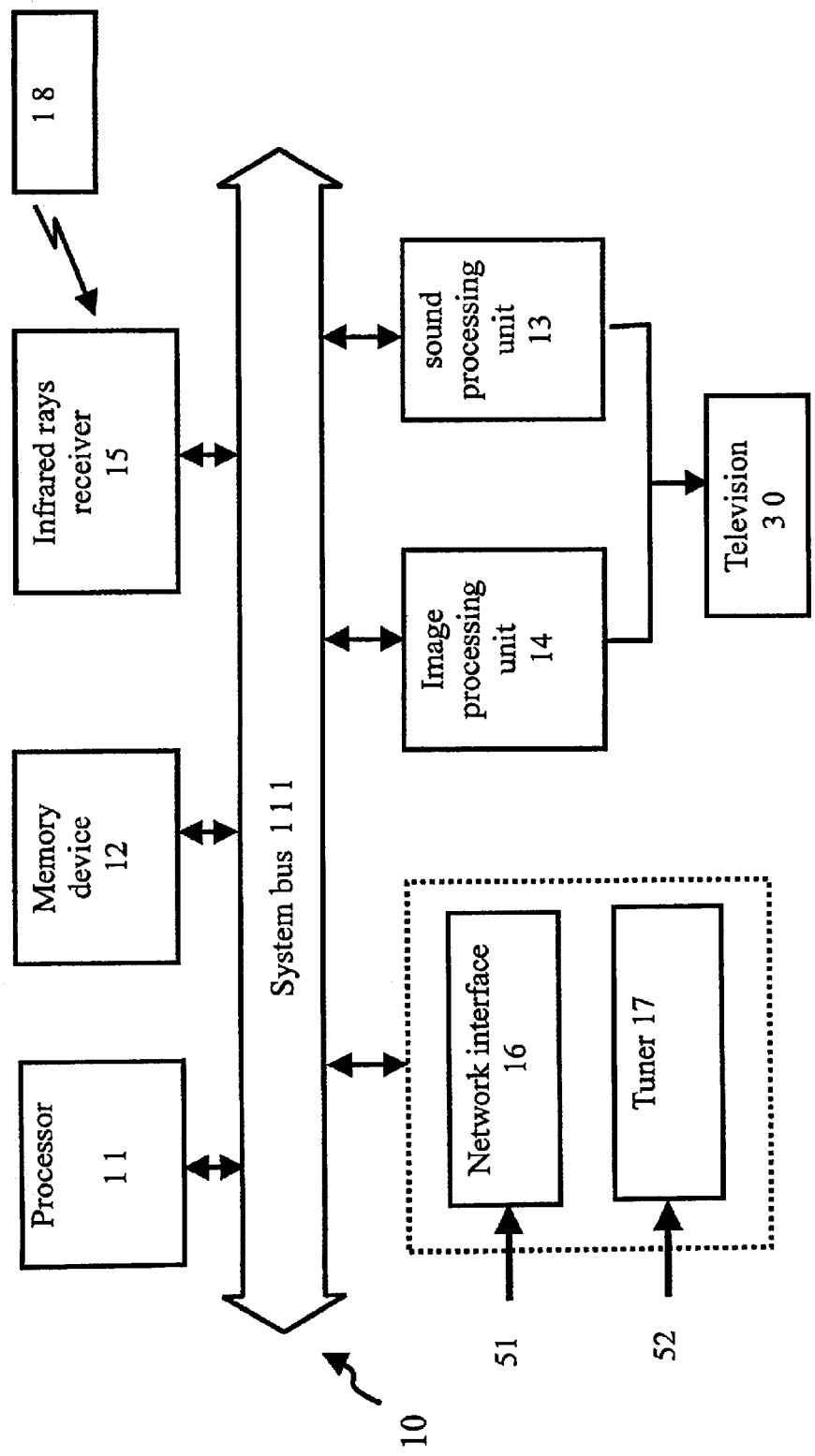
FIG. 2 is the hardware structure of a set top box.

Please refer to FIG. 2. FIG. 2 illustrates the set top box hardware structure. Many STB 10 components are similar to those found in a typical computer. The STB 10 comprises a processor 11, a system bus 111, a memory device 12 (such as DRAM, a hard disk, a memory card), a sound processing unit 13, an image processing unit 14, the infrared receiver 15, a network interface 16, a tuner 17 and the input device 18. Networking signals 51 (such as from Internet) are received by the network interface 16, and the tuner 17 receives TV tuner signals 52. However, in some cases, both the network signals 51 and the TV signals 52 are sent to the STB 10 via an identical cable. Since the characteristics of the present invention are not concerned with the particular hardware characteristics of the STB 10, there will be no further description of the hardware and associated functionality of the STB 10.

Figure 4:
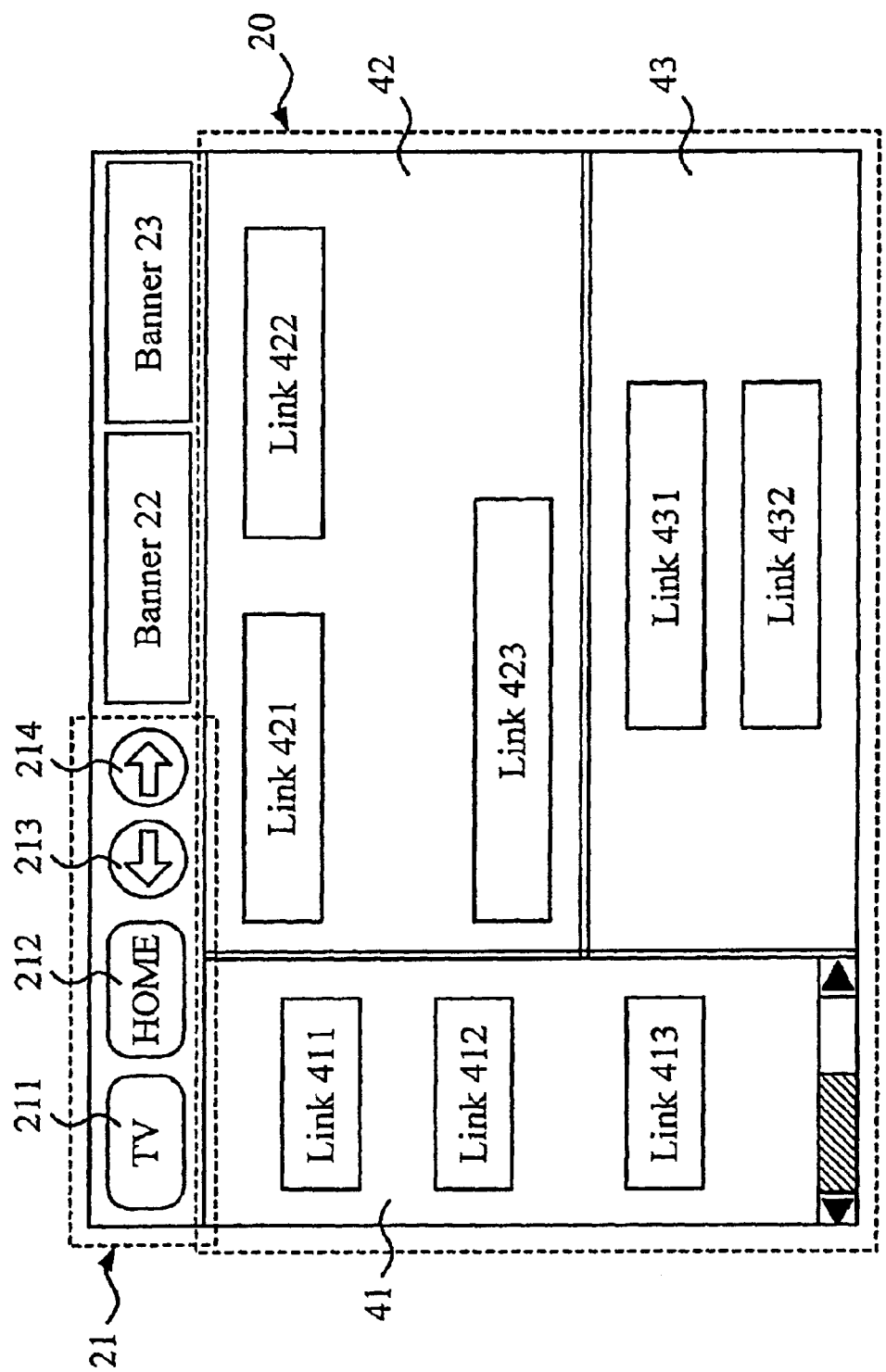
FIG. 4 is a screen display on a television of the embodiment according to the present invention.

The characteristic of the present invention allows the user to intuitionally move the focus between the window area 20 and the tool bar 21 via an input device 18. The input device 18 comprises four directional buttons 182: an up button, a down button, a left button and a right button. Please refer to FIG. 4. According to the embodiment, the window area 20 is divided into three sub-windows 41,42,43, and each sub-window comprises a plurality of links, such as links 411~413, links 421~423 and links 431~432. The tool bar comprises four function buttons 211, 212, 213, 214. Two banners 22,23 can also be arranged and displayed on the television 30 screen for advertisement purposes. When a user presses the directional button 182, the focus will move to the link, the sub-window, proceeding web page scrolling, or the tool bar 21 function button. However, the subject matter of the present invention is how to move the focus between the window area 20 and the tool bar 21, instead of moving the focus within the window area 20 which is an another application filed by the same applicant.

Figure 3:
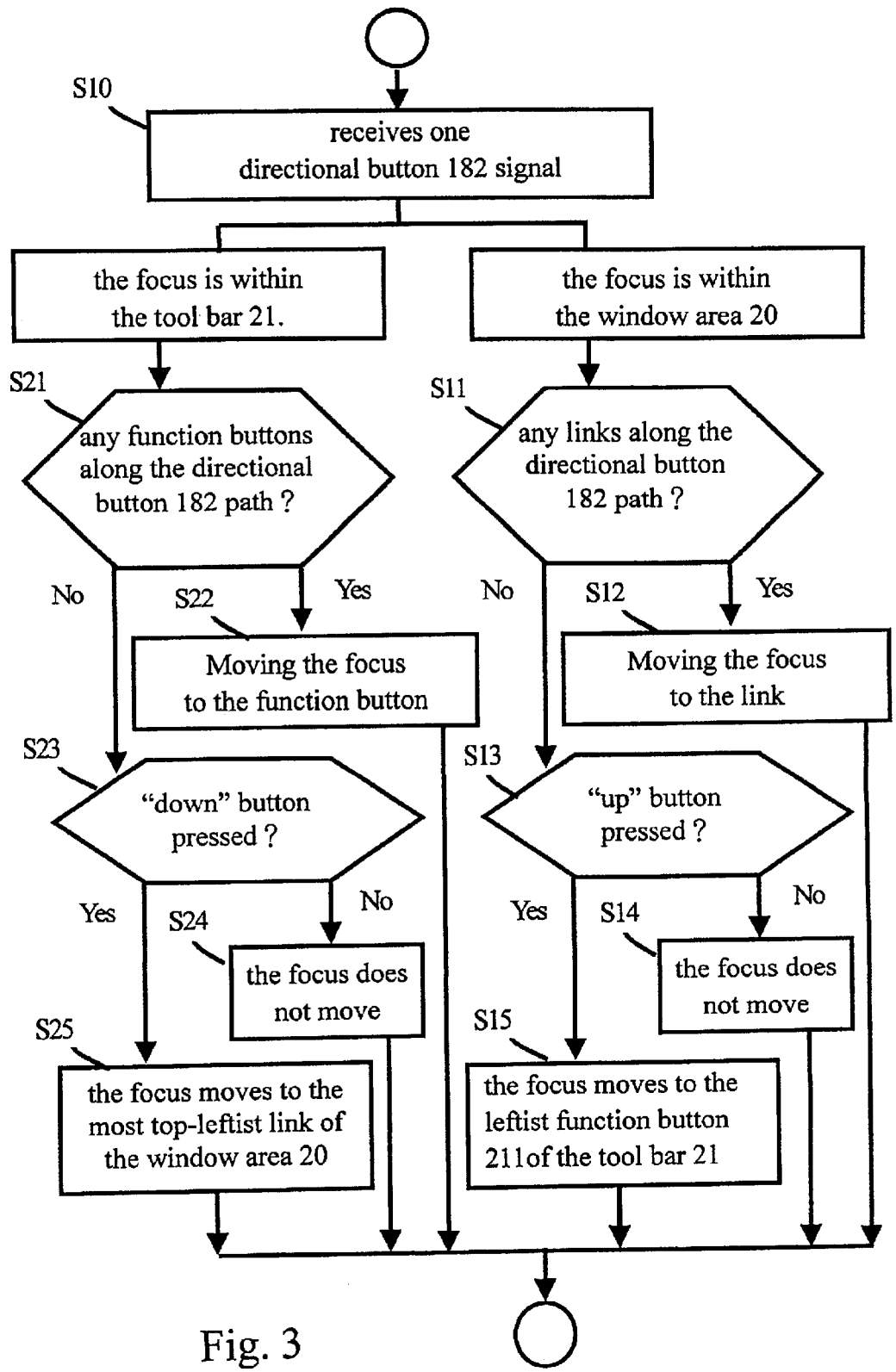
FIG. 3 is a flowchart of an embodiment of the present invention.

Please refer to FIG. 3. FIG. 3 is a flowchart of an embodiment of the present invention. The method of moving the focus between the window area 20 and the tool bar 21 in the window 20 is shown in FIG. 3. First, the STB 10 receives an up, down, left or right directional button 182 signal pressed by the user (Step 10). The signal is sent to the STB 10 infrared receiver 15 via the infrared transmitter 183, and is then processed by the STB 10. In the embodiment, the infrared transmitter 183 utilizes the Information Data Association (IDA) transmission standard and a PS2 interface to connect to the STB 10. The processor 11 converts a scan code transmitted from the infrared transmitter 183 to a key code, and the STB 10 controls on screen focus movement according to the directional button 182 as manipulated by the user. The present invention need not, however, be limited to the above-mentioned input device.

When the directional button 182 is pressed, there are two condition types:

Condition 1, the current focus position is within the window area 20. Please refer to steps S11~S15.

Condition 2, the current focus position is within the tool bar 21. Please refer to steps S21~S25.

Condition 1, the current focus position is within the window area 20:

Step 11:

Determining if there is a link along the directional button path 182 pressed by the user, if yes, then proceed to step 12, if no, then proceed to step 13.

Step 12:

Moving the focus to the link. For example, the focus is on the link 411 and the user presses the "down" directional button 182. The STB 10 receives the "down" directional button 182 signal. Since the link 412 is below the link 411, the STB 10 moves the focus to the link 412. If the focus is on the link 411 and the user presses the "right" directional button 182 instead of the "down" directional button 182, then the focus will move to the link 421.

Step 13:

Determining if the directional button 182 pressed by the user is the "up" button, if yes, then proceed to step 15, if no, then proceed to step 14.

Step 14:

Not moving the focus. For example, the focus is on the link 411 and the user presses the "left" directional button 182, then the focus does not move and will stay on the link 411.

Step 15:

Moving the focus to the tool bar 21, preferably moving the focus to the tool bar's 21 leftmost function button 211 to accommodate most user habits. For example, the focus is on the link 411 (or link 421, or link 422) and the user presses the "up" directional button 182, then the focus moves to the function button 211.

Condition 2, the current focus position is within the tool bar 21:

Step 21:

Determining if there are any function buttons along the directional button 182 path pressed by the user, if yes, then proceed to step 22, if no, then proceed to step 23.

Step 22:

Moving the focus to the function button. For example, the focus is on the function button 212 and the user presses the "right" directional button 182, then the focus will move to the function button 213.

Step 23:

Determining if the directional button 182 pressed by the user is the "down" button, if yes, then proceed to step 25, if no, then proceed to step 24.

Step 24:

Not moving the focus. For example, the focus is on function button 212 and the user presses the "up" directional button 182, then the focus does not move and will stay on function button 212. Another example, the focus is on function button 214 and the user presses the "right" directional button 182, then the focus does not move and will stay on the function button 214. However, the focus can also move to the function button 211 if a "recycle" function is active.

Step 25:

Moving the focus to the window area 20, preferably moving the focus to the window area's 20 topmost left link to accommodate most user habits. For example, the focus is on function button 211 (or function button 212, or 213, or 214) and the user presses the "down" directional button 182, then the focus moves to the link 411.

The invention has been described using exemplary preferred embodiments. However, for those skilled in this field the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

What is claimed is:

1. A method of intuitionally moving a focus between a window area and a tool bar to let a user intuitionally move the focus between the window area and the tool bar using an input device, wherein the input device comprises four directional buttons: an up button, a down button, a left button and a right button, wherein the window area comprising a plurality of links and the tool bar comprising a plurality of function buttons, the method comprising the steps of:

condition 1, the current focus position is within the window area:

step A: receiving an up, down, left or right directional button signal pressed by the user;

step B: determining if there is a link along the directional button path pressed by the user, if yes, then move the focus to the link, if no, then proceed to step C;

step C: determining if the directional button pressed by the user is the up button, then move the focus to the tool bar;

condition 2, the current focus position is within the tool bar:

step D: receiving an up, down, left or right button signal pressed by the user; and step E: determining if there are any function buttons along the directional button path pressed by the user, if yes, then move the focus to the function button, if no, then proceed to step F;

step F: determining if the directional button pressed by the user is the down button, then move the focus to the window area.

2. The method as claimed in claim 1, wherein the focus moves to the leftmost functional tool bar button in step C.

3. The method as claimed in claim 1, wherein the focus moves to the topmost left link of the window area in step F.

4. The method as claimed in claim 1, wherein the focus will not move if the directional button pressed by the user is not the up button in step C.

5. The method as claimed in claim 1, wherein the focus will not move if the directional button pressed by the user is not the down button in step F.

6. A set top box for receiving network signals to link to a website and outputting an image signal to a television, a user capable of viewing website content via the television, the set top box providing an input device so that the user can intuitionally move the focus between the window area and the tool bar, wherein the input device comprises four directional buttons: an up button, a down button, a left button and a right button, wherein the window area comprises a plurality of links and the tool bar comprising a plurality of function buttons, the set top box comprising:

a processor;

a memory, coupled to said processor; and a first sequence of instructions, which, when executed by said processor, causes said processor to perform the steps of:

condition 1, the current focus position is within the window area:

step A: receiving an up, down, left or right directional button signal pressed by the user;

step B: determining if there is a link along the direction button path pressed by the user, if yes, then move the focus to the link, if no, then proceed to step C;

step C: determining if the directional button pressed by the user is the up button, then move the focus to the tool bar;

condition 2, the current focus position is within the tool bar:

step D: receiving an up, down, left or right button signal pressed by the user; and step E: determining if there are any function buttons along the direction button path pressed by the user, if yes, then move the focus to the function button, if no, then proceed to step F;

step F: determining if the direction button pressed by the user is the down button, then move the focus to the window area.

7. The set top box as claimed in claim 6, wherein the focus moves to the leftmost function button of the tool bar in step C.

8. The set top box as claimed in claim 6, wherein the focus moves to the topmost left link of the window area in step F.

9. The set top box as claimed in claim 6, wherein the focus will not move if the directional button pressed by the user is not the up button in step C.

10. The set top box as claimed in claim 6, wherein the focus will not move if the directional button pressed by the user is not the down button in step F.

* * * * *